(12) United States Patent
Adams

(10) Patent No.: US 12,223,713 B2
(45) Date of Patent: Feb. 11, 2025

(54) GEOSPATIAL VEGETATION CORRELATION SYSTEM AND METHOD

(71) Applicant: Edward R. Adams, Minneapolis, MN (US)

(72) Inventor: Edward R. Adams, Minneapolis, MN (US)

(73) Assignee: Edward R. Adams, Minneapolis, MN (US)

( * ) Notice: Subject to any disclaimer, the term of this patent is extended or adjusted under 35 U.S.C. 154(b) by 699 days.

(21) Appl. No.: 17/478,474

(22) Filed: Sep. 17, 2021

(65) Prior Publication Data

US 2022/0148305 A1    May 12, 2022

Related U.S. Application Data

(60) Provisional application No. 63/079,711, filed on Sep. 17, 2020.

(51) Int. Cl.
*G06V 20/10*    (2022.01)
*G06N 3/08*    (2023.01)
(Continued)

(52) U.S. Cl.
CPC ............ *G06V 20/188* (2022.01); *G06N 3/08* (2013.01); *G06Q 30/018* (2013.01); *G06Q 50/02* (2013.01);
(Continued)

(58) Field of Classification Search
CPC .... G06V 20/188; G06V 10/774; G06V 10/82; G06V 20/13; G06N 3/08; G06N 3/04; G06N 3/084; G06Q 30/018; G06Q 50/02
See application file for complete search history.

(56) References Cited

U.S. PATENT DOCUMENTS 5,887,547 A * 3/1999 Caveny .................. A01G 15/00
                                                    47/58.1 R
9,266,057 B1 * 2/2016 Jones ................. B01D 53/1425
(Continued)

FOREIGN PATENT DOCUMENTS

WO    WO-2009108989 A1 *   9/2009   ........... G06Q 10/043

OTHER PUBLICATIONS

Kale, Manish P., et al. "Patterns of carbon sequestration in forests of Western Ghats and study of applicability of remote sensing in generating carbon credits through afforestation/reforestation." Journal of the Indian Society of remote Sensing 37 (2009): 457-471.*

*Primary Examiner* — Xuemei G Chen
(74) *Attorney, Agent, or Firm* — SCHWEGMAN LUNDBERG & WOESSNER, P.A.

(57) ABSTRACT

A computer implemented method includes obtaining geospatial coordinates for multiple points defining boundaries of a subject property, obtaining an image of the subject property from one or more positions above the earth, identifying forms and amounts of vegetation within the boundaries of the subject property based on the image, determining carbon offset values for the forms of vegetation identified within the boundaries of the subject property, and combining the carbon offset values based on the amounts of vegetation to derive a total offset for the subject property. Carbon offset values may be determined for multiple properties and aggregated until a threshold total value is reached, forming an aggregated carbon offset. An electronic exchange may be updated with the aggregated carbon offset. Value received may be apportioned back to respective property owners.

16 Claims, 5 Drawing Sheets

(51) Int. Cl.
  *G06Q 30/018* (2023.01)
  *G06Q 50/02* (2012.01)
  *G06V 10/774* (2022.01)
  *G06V 10/82* (2022.01)
  *G06V 20/13* (2022.01)

(52) U.S. Cl.
  CPC ............ *G06V 10/774* (2022.01); *G06V 10/82* (2022.01); *G06V 20/13* (2022.01)

(56) References Cited

U.S. PATENT DOCUMENTS

| | | | | |
|---|---|---|---|---|
| 2002/0198736 | A1* | 12/2002 | Harrison | G06Q 50/16 705/51 |
| 2007/0073604 | A1* | 3/2007 | Millen, II | G06Q 40/00 705/35 |
| 2007/0226004 | A1* | 9/2007 | Harrison | G09B 29/007 705/26.1 |
| 2008/0131974 | A1* | 6/2008 | Sullivan | G01N 33/24 73/863 |
| 2009/0171980 | A1* | 7/2009 | Meadow | G06F 16/51 |
| 2010/0040260 | A1* | 2/2010 | Kelle | G06V 20/188 382/110 |
| 2010/0185521 | A1* | 7/2010 | Lewis | G06Q 30/06 705/17 |
| 2011/0196710 | A1* | 8/2011 | Rao | G06Q 40/04 705/37 |
| 2011/0212479 | A1* | 9/2011 | Rodgers | G06Q 10/04 435/287.1 |
| 2014/0019179 | A1* | 1/2014 | Gosalvez | G06Q 50/02 705/7.11 |
| 2014/0164070 | A1* | 6/2014 | Smith | G06Q 10/06375 705/7.37 |
| 2018/0217119 | A1* | 8/2018 | Gross | B01D 53/62 |
| 2019/0286905 | A1* | 9/2019 | Ritter | G06T 7/174 |
| 2022/0012757 | A1* | 1/2022 | Walker | G06Q 40/04 |
| 2022/0327463 | A1* | 10/2022 | DeLuca | G06Q 50/02 |
| 2023/0274197 | A1* | 8/2023 | Zhao | G01C 11/00 382/100 |

* cited by examiner

GEOSPATIAL VEGETATION CORRELATION SYSTEM AND METHOD

RELATED APPLICATION

This application claims priority to U.S. Provisional Application Ser. No. 63/079,711 (entitled Carbon Offset Calculation and Automated Exchange, filed Sep. 17, 2020) which is incorporated herein by reference in its entirety.

BACKGROUND

A Carbon offset may be based on any activity that compensates for the emission of carbon dioxide ($CO_2$) or other greenhouse gases (measured in carbon dioxide equivalents [$CO_2e$]) by providing for an emission reduction elsewhere. Because greenhouse gases are widespread in Earth's atmosphere, the climate benefits from emission reductions regardless of where such cutbacks occur. If carbon reductions are equivalent to the total carbon footprint of an activity, then the activity is said to be "carbon neutral" Carbon offsets can be bought, sold, or traded as part of a carbon market.

Carbon offsets may be based on the type and quantity of vegetation planted in a particular area. It can be difficult to determine the type and quantity of vegetation that currently exists or has changed over time due to human activity. Surveys can be time consuming and inaccurate.

DETAILED DESCRIPTION

Figure 1:
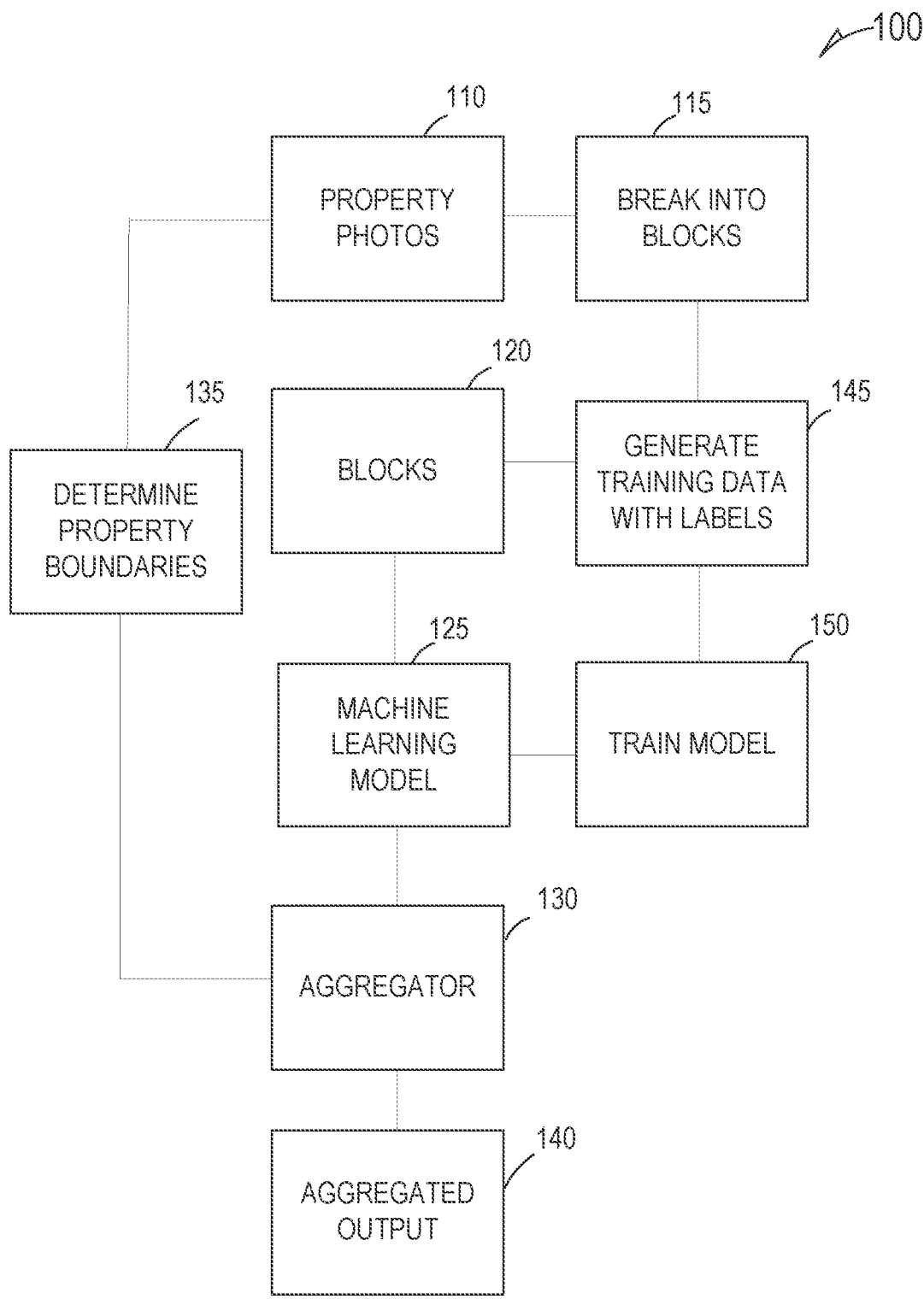
FIG. 1 is a block diagram of a neural network system for calculating carbon offsets based on satellite photography according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A Carbon offset may be based on an, activity that compensates for the emission of carbon dioxide ($CO_2$) or other greenhouse gases (measured in carbon dioxide equivalents [$CO_2e$]) by providing for an emission reduction elsewhere. Because greenhouse gases are widespread in Earth's atmosphere, the climate benefits from emission reductions regardless of where such cutbacks occur. If carbon reductions are equivalent to the total carbon footprint of an activity, then the activity is said to be "carbon neutral." Carbon offsets can be bought, sold, or traded as part of a carbon market.

The use of the term offset to refer to emissions compensated for by decreases at another facility has been used since the late 1970s as part of the U.S. Clean Air Act, in which new emissions in high-pollution areas were allowed only where other reductions occurred to offset the increases. In addition, the popularization of the term carbon offset in the first decade of the 21st century accompanied growing concern about $CO_2$ as an atmospheric pollutant. Examples of projects that produce carbon offsets include renewable energy projects, such as building wind farms that replace coal-fired power plants, Energy-efficiency improvements, such as increasing insulation in buildings to reduce heat loss or using more-efficient vehicles for transportation, destruction of potent industrial greenhouse gases such as halocarbons, and carbon sequestration in soils or forests, such as tree-planting activities.

Carbon offsets can be bought and sold as part of compliance schemes, such as the United Nations Framework Convention on Climate Change (UNFCCC) Kyoto Protocol or the European Union Emission Trading Scheme (EU ETS, a regional carbon market where European countries can trade carbon allowances to meet regional emission-reduction goals). A benefit of carbon offsetting within such compliance schemes is that it enables emission reductions to occur where costs are lower, leading to greater economic efficiency where emissions are regulated. The Kyoto Protocol requires parties in the developed world to limit greenhouse gas emissions relative to their emissions in 1990. Under the Kyoto Protocol, emissions trading in a so-called carbon market may help them meet their targeted limit: a party can sell an unused emissions allowance to a party above its limit. The protocol also allows carbon offsets to be traded. Kyoto Protocol parties can obtain offsets through a mechanism called joint implementation (JI), where one party develops an emission-reduction or emission-removal project in another country where emissions are limited. Parties can also obtain offsets through the Clean Development Mechanism (CDM) for projects in developing countries, where emissions are not otherwise limited.

Consumers and businesses may also voluntarily buy carbon offsets to compensate for their emissions. Large purchasers of offsets include organizers of major events such as the Olympic Games, which can aspire to be carbon neutral, and companies such as Google, HSBC Holdings PLC, and IKEA. The voluntary market in offsets is largely unregulated, though several international standards have been developed to assess their quality. For example, in March 2006 the International Organization for Standardization (ISO) developed standard 14064 on greenhouse gas accounting, verification, validation, and accreditation of standard-setting bodies. In addition, the Gold Standard registry, created as a tracking database for the CDM and the JI, was developed in 2003 by a consortium of nonprofit sponsors to certify carbon projects and track credits.

The carbon-offsetting process faces a number of challenges, including the quantification of carbon benefits and verification that a party's greenhouse gas reduction is indeed occurring. In order to be effective, a carbon offset must be additional—that is, the project must reduce greenhouse gas emissions more than would have occurred in the absence of the offset. Thus, the carbon benefits of each project need to be determined relative to what would have occurred under a business-as-usual scenario. Furthermore, the permanence of the emission-reduction project needs to be taken into account. For example, a tree planted in one year to offset carbon should not be removed in the future. Carbon offset projects can also create leakage, where a project causes impacts that unintentionally increase emissions elsewhere, such as when deforestation is simply relocated rather than avoided.

Carbon offsets may be created and transferred in a variety of methods. While some standards for determining carbon offsets have been set in the industry, such standards are remarkably imposed by individuals, not the government. There still remains some baseline criteria for determining carbon offsets. In order to be deemed an "offset," there has to be proof that the carbon emissions would not have been reduced without money being paid in a manner that preserves or increases the capacity of plants to consume $CO_2$.

Several different examples help illustrate the above description of determining carbon offsets. In one example, if one were to pay someone to preserve a forest, it would count as an offset if that forest had originally been scheduled for development. A landowner in need of money from the timber would then be instead paid to keep their trees standing. If there was never a threat to the forest, the payment to the landowner wouldn't count as an offset because the money transfer results in no additional benefit as the forest would have remained regardless of the transfer.

In another example, landowners have been paid to let their grass grow longer so that it absorbs more carbon. Such payments have resulted in the creation of carbon offsets. In further examples, forests (good carbon sinks) are being replaced with grasslands and ranches (worse carbon sinks). New evidence is emerging, however that grasses could actually be better at putting away carbon than trees. It is possible that the creation or preservation of grasslands may qualify for creating offset credits.

The calculation of carbon offsets can be based on quality of soil, growing conditions, and the type of plant. Various methods for such calculations may rely on a "biomass formula" which basically uses the mass of a plant to determine how much carbon it took out of the atmosphere (since the carbon gets converted to part of the plant). Many calculations are based on metric tonnes, not imperial tons.

Trees: one source estimates that an acre of nontropical trees can absorb 10 tons of $CO_2$ each year. It's worth noting that the paper cites to another book which is not available online. Another one, with the methodology available, puts the number (for urban trees at around 11 tons of $CO_2$ per hectare, which is about 4.45 tons $CO_2$ per acre. This value is not a per year value, but rather an estimation of the amount of carbon that will be stored/removed from the atmosphere by the trees. A "biomass formula" used to make such calculations takes the size of a particular species of tree and uses the size to determine how much $CO_2$ was taken up by a tree, as $CO_2$ is actually incorporated into the mass of the tree.

A further source suggests that urban trees can hold an astounding 661 tons per hectare (around 268 tons per acre) and the trees combined with the soil can hold 3163 tons per hectare (around 1281 tons per acre). The data appears to vary widely from region to region because there are different conditions and because little research has been done on this topic, but there is at least one study that has attempted to compare the different regions. The study lists several cities and identifies carbon storage and sequestration estimates per unit of tree cover and percent tree cover.

A few examples from the study are shown in TABLE 1:

TABLE 1

| City/state | Storage kg C m$^{-2}$ | Sequestration estimate SE |
|---|---|---|
| Arlington, TX | 6.37 | 0.73 |
| Atlanta, GA | 6.63 | 0.54 |
| Baltimore, MD | 8.76 | 1.09 |
| Boston, MA | 7.02 | 0.96 |
| Casper, WY | 6.97 | 1.50 |
| Chicago, IL | 6.03 | 0.64 |

TABLE 1-continued

| City/state | Storage kg C m$^{-2}$ | Sequestration estimate SE |
|---|---|---|
| Omaha, NE | 14.14 | 2 29 |
| Kansas | 7.42 | 1.30 |

Corn can sequester 5.4 tons $CO_2$ per hectare per year, which is around 2.19 tons $CO_2$ per acre per year.

Switchgrass, a common prairie grass can sequester 8.0 tons $CO_2$ per hectare per year, which is around 3.24 tons $CO_2$ per acre per year.

Carbon offsets may be expressed in term of monetary value. To estimate monetary value associated with urban tree carbon storage and sequestration, carbon values may be multiplied by $78.5 per tonne of carbon (range=$17.2-128.7 tC$^{-1}$) based on the estimated social costs of carbon for 2010 with a 3% discount rate. Note that current values may be adjusted based on year and different discount rates.

Average carbon storage per square meter of tree cover varies by sampled city and state as shown in TABLE 1, with overall carbon storage averaging 7.69 kg C m$^{-2}$ (SE=1.36), gross carbon sequestration rate averaging 0.277 kg C m$^{-2}$ year$^{-1}$ (SE=0.045), and net carbon sequestration rate averaging 0.205 kg C m$^{-2}$ year$^{-1}$ (SE=0.041). The net sequestration rate averages 74% of the gross sequestration rate. Total carbon storage and sequestration rates in urban and urban/community areas also varied among the United States with total urban tree carbon storage estimated as 643 million tonnes (SE=23.8 million; value=$50.5 billion) and total urban/community tree carbon storage estimated as 1.36 billion tonnes (SE=57.0 million; value=$106.9 billion). Annual gross carbon sequestration is 25.6 million tonnes year$^{-1}$ (SE=1.0 million; value=$2.0 billion) in urban areas and 50.3 million tonnes year-1 in urban/community areas (SE=1.8 million; value=$4.0 billion). Annual net carbon sequestration is 18.9 million tonnes year$^{-1}$ (SE=862,000; value=$1.5 billion) in urban and 37.2 million tonnes year$^{-1}$ in urban/community areas (SE=1.7 million; value=$2.9 billion). However, it should be noted that Alaska contains 17% of the total U.S. urban/community area due to its relatively large community boundaries. If urban/community estimates focus on the conterminous United States, the carbon storage, annual gross sequestration and annual net sequestration estimates drop to 1.1 billion, 44.7 million, and 33.1 million tonnes, respectively.

In terms of national overlap between conterminous U.S. forestland estimates and urban forest estimates, 13.7% of urban land, or about 38.6% of all urban tree cover, is measured by the U.S. forest inventory plots. From the national forest plot perspective, about 1.5% of all forestland plots are in urban areas in the conterminous U.S. (9.3 million ha). Carbon storage that is accounted for in both the national forestland and urban forest estimates ranges from 247 million tonnes using the 38.6% urban overlap estimate to 303 million tonnes using the 1.5% national forestland overlap estimate.

One problem facing many homeowners is that the property they own tends to be smaller than the size of a property needed in order to generate a sufficient value of carbon offsets for conventional carbon offset markets. In addition, it can be difficult to accurately calculate carbon offsets for such property and even harder to ensure that the carbon offsets are maintained over time.

In various embodiments of the present application, satellite generated photographs of property may be used to determine the types and density of plants and coverages for the plants on multiple properties owned by an individual, or multiple different individuals. The data obtained from the photographs may be used to determine carbon offsets for each property.

FIG. 1 is a block diagram of a system 100 for determining carbon offsets for one or more properties. System 100 includes property photos 110 that may be obtained from satellite photography. The photos 110 may include metadata identifying property lines as well as time and date that the photos were taken.

The photos 110 may be broken into blocks at 115 as described in further detail below. The resulting blocks are shown at 120 and are provided to a maching learning model 125 to classify blocks as various types of vegetation. Classifications are sent to aggregator 130, which also received property boundary information derived at 135 from the photo metadata. The aggregator 130 may also calculate carbon offsets per block and uses this information to aggregate blocks and multiple properties corresponding to a desired amount of carbon offsets.

At 145, the blocks as determined at 115 are also provided for training the model 125. The blocks may be labeled with corresponding vegetation 145 or actual carbon offset value at 145 and then used to train at 150 the model 125. The resulting model 125 can then either identify carbon offsets directly from each block or identify the vegetation which can be used to index into a table of carbon offsets to obtain the carbon offset value.

In one embodiment, the determined carbon offsets may then be aggregated to form a bundle of properties having an aggregated value of carbon offset sufficient for transfer in an established carbon offset marketplace. Upon a transfer for value, the value obtained may then be apportioned back to the one or more corresponding property owners.

The trained neural network model 125 may be used to determine carbon offsets based on the photographs. In one embodiment, a piece of property may be broken down into multiple blocks 120. The size of the blocks may be varied in different embodiments but may be selected to correspond to an average tree canopy in one embodiment. The neural network may be trained by selecting several blocks, such as hundreds of blocks or even thousands of blocks and labeling 145 each block of a fixed size and magnification with a human generated identification of the tree or plants that are actually seen by humans in the blocks. This labeled data, referred to as the training data is then used to train 150 the model 125 to identify vegetation, such as plants in satellite photographs corresponding to each property that has been broken down into the selected block size and magnification. The identifications are accompanied with corresponding confidence values. As indicated above, the model 125 may directly identify offsets in one example.

If confidence values for plant predictions based on a canopy sized block are insufficient, smaller block sizes may be iteratively tried until suitable confidence values are obtained. For instance, a coverage of dwarf trees may be better identified with smaller block sizes. Similarly, coverage of bushes may be better identified with even smaller block sizes. In some embodiments, it may be known that the property consists of mostly grasslands, in which case larger block sizes may be generated at 115. A confidence level of greater than 80% may be used as a threshold for accepting a block size as adequate for the purpose of calculating carbon offsets and in providing feedback to 115 to modify the block size. An iterative process may be used, with different block sizes in order to obtain block sizes with desired confidence levels. In further embodiments, lower or higher confidence levels may be utilized.

In one embodiment, before and after photographs may be used to calculate carbon offset values. Such before and after photographs may be useful in situations where money is spent to increase the ability of a property to capture carbon. In other embodiments, where a payment is made to preserve an otherwise destined fir destruction of plants situation, the total value of carbon offsets based on existing vegetation may be used for the property.

Boundary lines of each property may be identified via geospatial imaging information and services. Ownership of each property may be identified via public records kept by local government entities, such as at the county level in most US states.

Carbon offset values for specific forms of vegetation on each property may then be calculated for each block and aggregated for each piece of property. Owners of each property may be contacted and apprised of their respective values. By combining multiple properties, a Money Tree Value may be arrived at as a critical mass of subject property Money Tree Values aggregated in amount optimized for sale to carbon offset buyers Carbon offset buyers may then be contacted via multiple exchanges and bidding instituted to optimize amount received for property owners. Monies received from carbon offset buyers and paid to Money Tree Value property owners less an aggregating and exchange fee.

In one embodiment, temporally spaced images may be utilized to review carbon offset efficacy and Money Tree Values on the aggregated properties to ensure that carbon offsets are still consistent.

Figure 2:
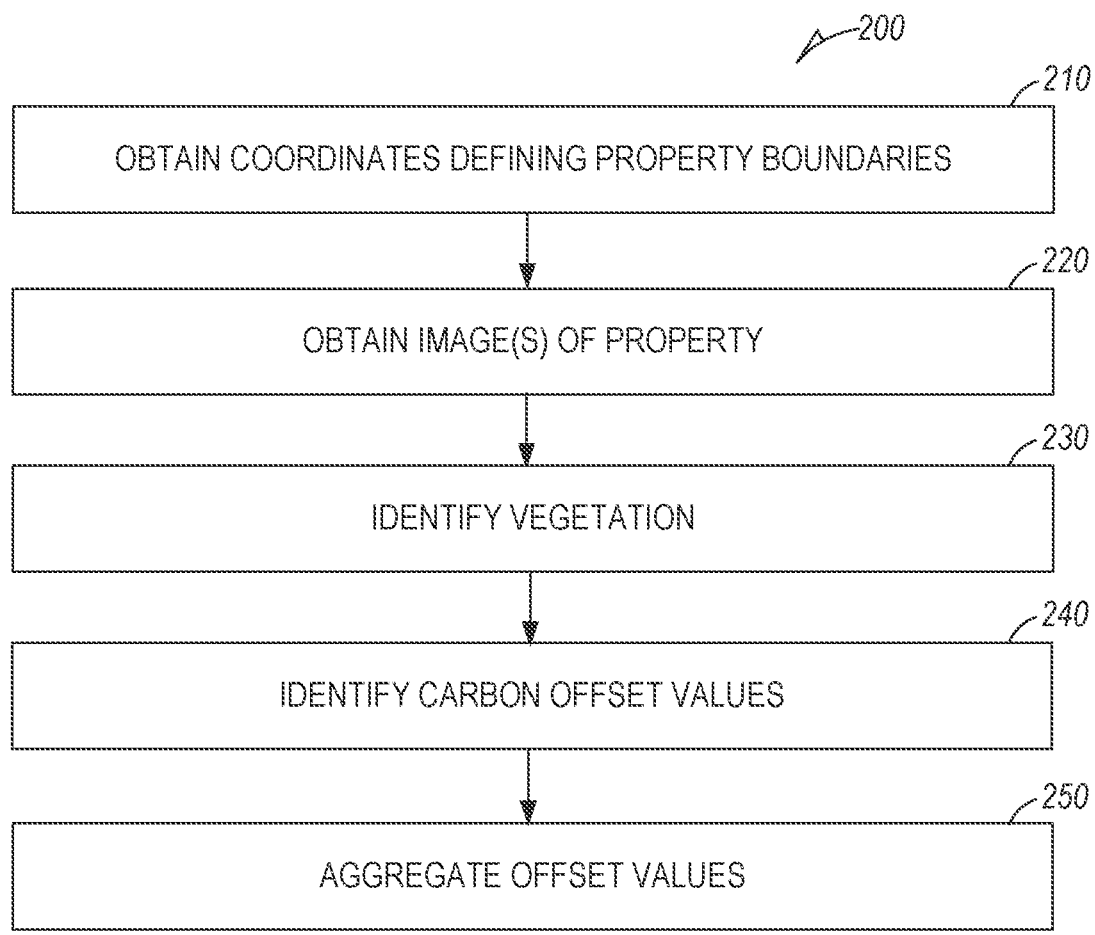
FIG. 2 is a flowchart illustrating a computer implemented method of using images, such as satellite images, for determining carbon offsets according to an example embodiment.

FIG. 2 is a flowchart illustrating a computer implemented method 200 of using images, such as satellite images, for determining carbon offsets. Method 200 begins at operation 210 by obtaining geospatial coordinates for multiple points defining boundaries of a subject property. The geospatial coordinates may be identified based on public property ownership records. At operation 220, an image or images of the subject property from one or more positions above the earth are obtained. Forms and amounts of vegetation within the boundaries of the subject property may be identified based on the image at operation 230.

In one example, identifying forms and amounts of vegetation within the boundaries of the subject property is performed by a neural network trained on labeled images. Each labeled image comprises a block having a selected size and a label identifying vegetation observed within the block. The block size may be selected to correspond to an average tree canopy or bush, and may be varied for different blocks within the image.

Operation 240 determines carbon offset values for the forms of vegetation identified within the boundaries of the subject property. At operation 250, the carbon offset values based on the amounts of vegetation are aggregated to derive a total offset for the subject property.

Operation 240 may also utilize carbon offset values for multiple properties to generate an aggregation of carbon offset values until a threshold total value is reached, forming an aggregated carbon offset.

In one example, the neural network provides a confidence level for each identification of vegetation, and wherein the confidence level below the threshold results in a reduced block size being used for further iterations of identifying forms and amounts of vegetation until the threshold is met.

Figure 3:
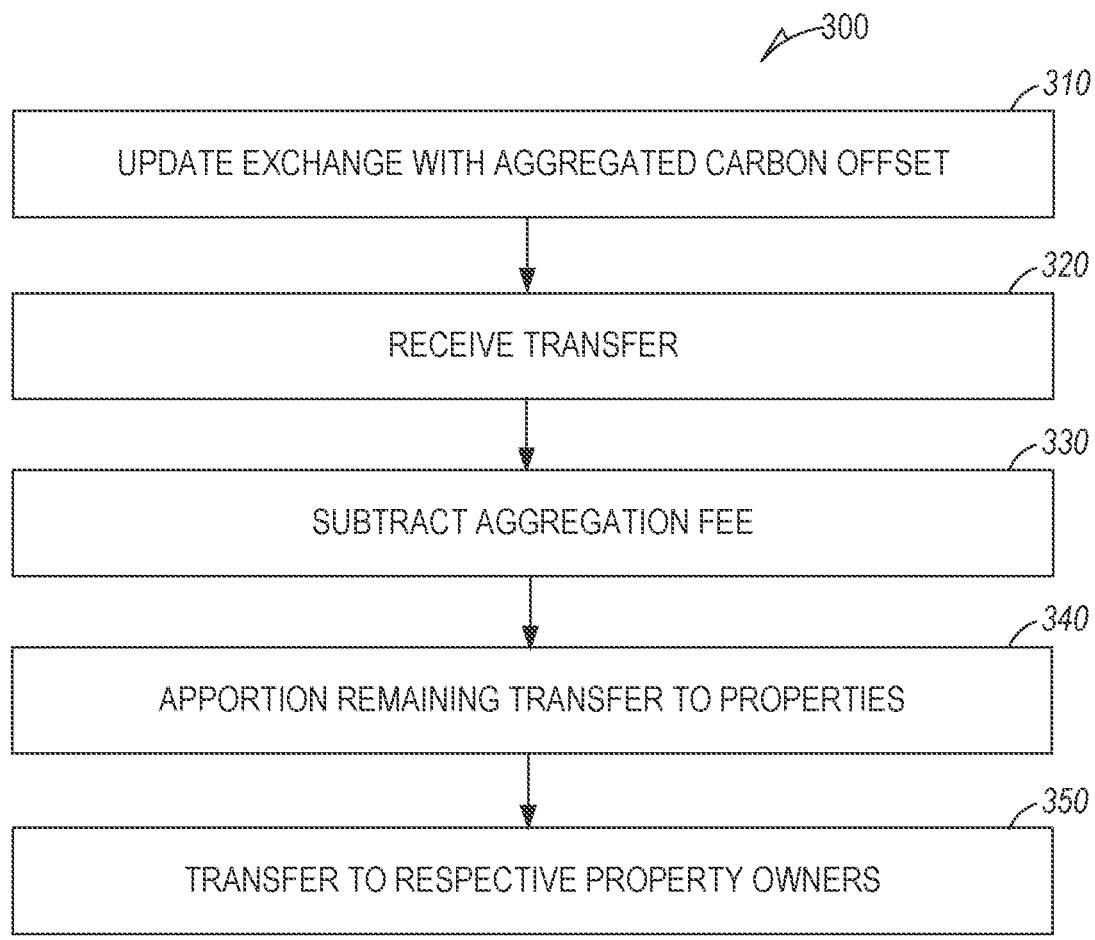
FIG. 3 is a flowchart of a computer implemented method 300 for interfacing with an electronic exchange for carbon offsets according to an example embodiment.

FIG. 3 is a flowchart of a computer implemented method 300 for interfacing with an electronic exchange for carbon offsets. At operation 310 an electronic exchange is automatically updated with the aggregated carbon offset from method 200. Operation 320 receives an electronic transfer representative of a purchase of the aggregated carbon offset.

Operation 330 subtracts an aggregation fee from the electronic value transfer. Operation 340 apportions the remaining electronic value transfer to respective property owners based on respective property carbon offset values. Operation 350 electronically transfers the apportioned values to the respective property owners.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

Figure 4:
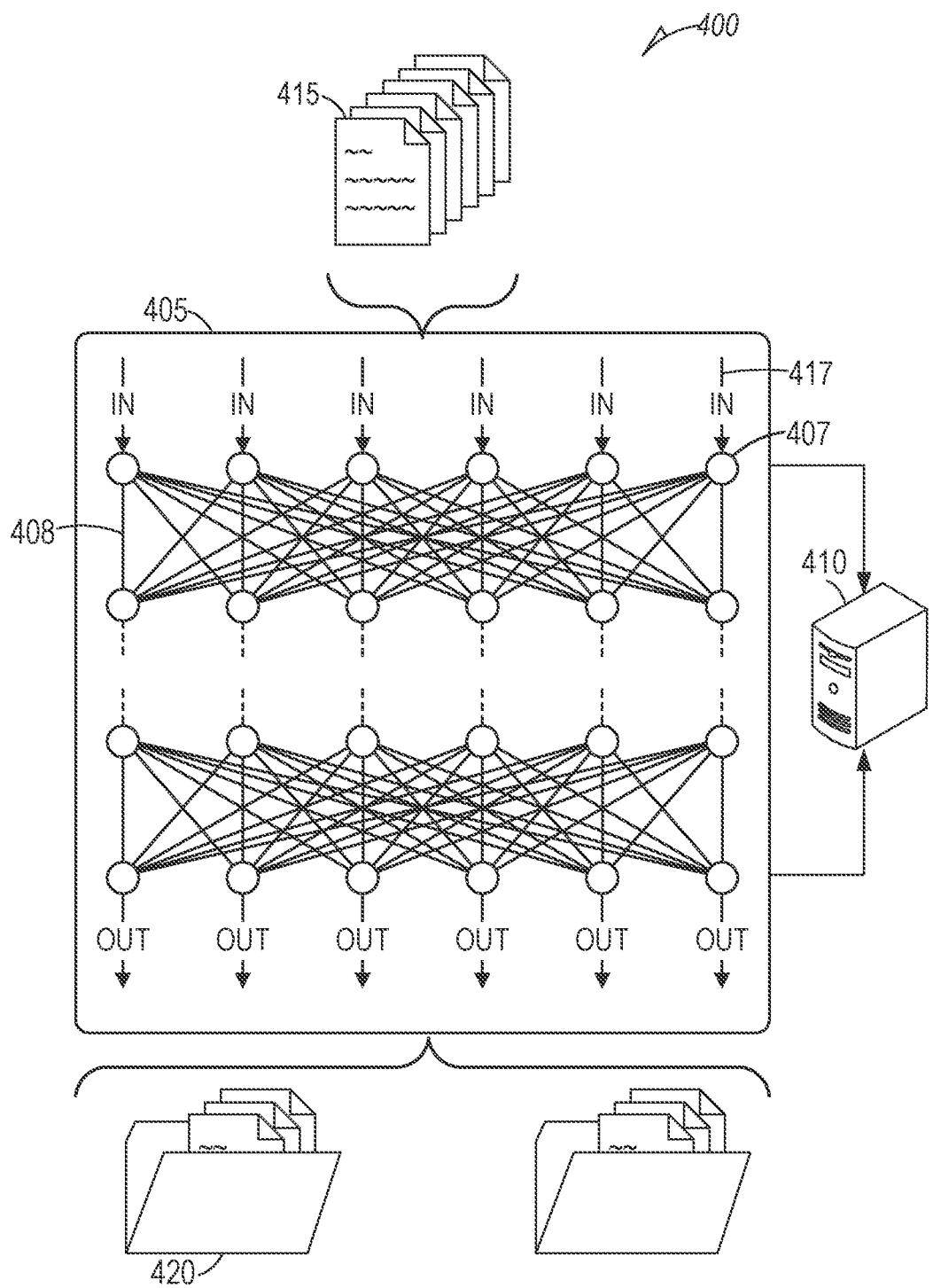
FIG. 4 is a block diagram of an example of an environment including a system for neural network training, according to an embodiment.

FIG. 4 is a block diagram of an example of an environment including a system for neural network training, according to an embodiment. The system includes an ANN 105 that is trained using a processing node 410. The processing node 410 may be a CPU, GPU, field programmable gate array (FPGA), digital signal processor (DSP), application specific integrated circuit (ASIC), or other processing circuitry. In an example, multiple processing nodes may be employed to train different layers of the ANN 405, or even different nodes 407 within layers. Thus, a set of processing nodes 410 is arranged to perform the training of the ANN 405.

The set of processing nodes 410 is arranged to receive a training set 415 for the ANN 405. The ANN 405 comprises a set of nodes 407 arranged in layers (illustrated as rows of nodes 407) and a set of inter-node weights 408 (e.g., parameters) between nodes in the set of nodes. In an example, the training set 415 is a subset of a complete training set. Here, the subset may enable processing nodes with limited storage resources to participate in training the ANN 405.

The training data may include multiple numerical values representative of a domain, such as red, green, and blue pixel values and intensity values for an image or pitch and volume values at discrete times for speech recognition. Each value of the training, or input 417 to be classified once ANN 405 is trained, is provided to a corresponding node 407 in the first layer or input layer of ANN 405. The values propagate through the layers and are changed by the objective function.

Model 125 as indicated above is trained on various sized blocks derived from photos of property that include vegetation, such as various trees, bushes, and shrubs each having corresponding carbon offsets. The blocks are labeled in the training data, either with the type of vegetation or directly with the corresponding carbon offset. Given this trained model 125, the output of the model is either the corresponding carbon offset, or the type of vegetation for each block which may be used to easily find the corresponding carbon offset.

As noted above, the set of processing nodes is arranged to train the neural network to create a trained neural network. Once trained, data input into the ANN will produce valid classifications 420 (e.g., the input data 417 will be assigned into categories), for example. The training performed by the set of processing nodes 407 is iterative In an example, each iteration of the training the neural network is performed independently between layers of the ANN 405. Thus, two distinct lay ers may be processed in parallel by different members of the set of processing nodes. In an example, different layers of the ANN 405 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 407 (e.g., neurons) are trained independently. In an example, the nodes are trained on different hardware.

Figure 5:
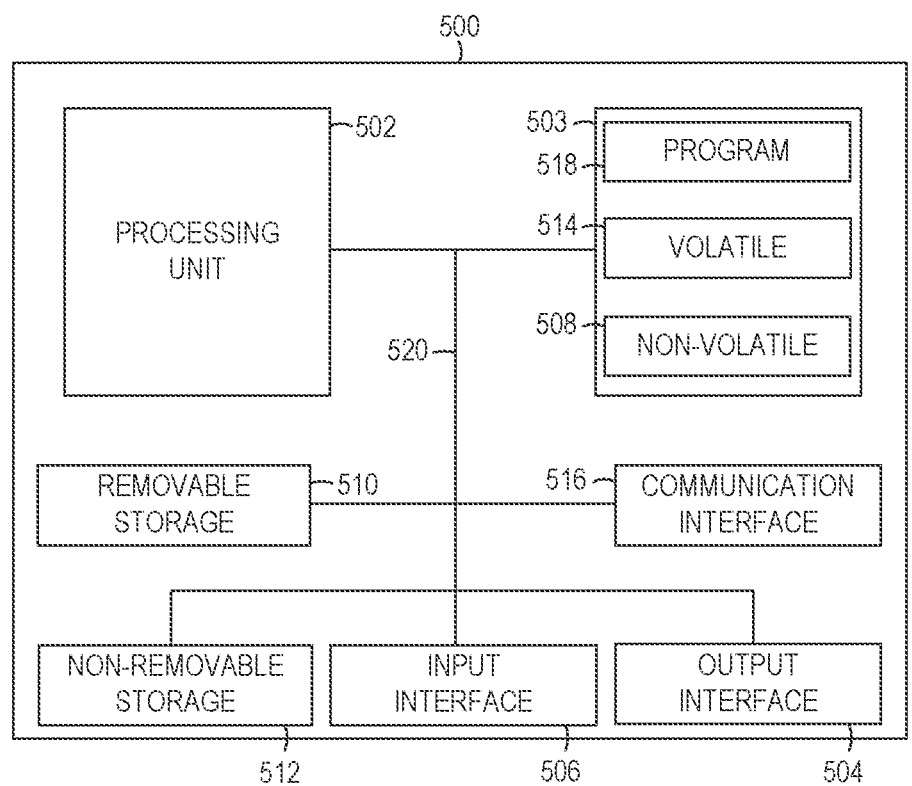
FIG. 5 is a block schematic diagram of a computer system to implement one or more example embodiments.

FIG. 5 is a block schematic diagram of a computer system 500 to implement and manage the calculation of carbon offset values and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more neural networks and algorithms for calculating carbon offset values, aggregations of such values, and facilitating transactions based on aggregations of multiple properties. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes obtaining geospatial coordinates for multiple points defining boundaries of a subject property, obtaining an image of the subject property from one or more positions above the earth, identifying forms and amounts of vegetation within the boundaries of the subject property based on the image, determining carbon offset values for the forms of vegetation identified within the boundaries of the subject property, and combining the carbon offset values based on the amounts of vegetation to derive a total offset for the subject property.

2. The method of example 1 wherein identifying forms and amounts of vegetation within the boundaries of the subject property is performed by a neural network trained on labeled images.

3. The method of example 2 wherein each labeled image comprises a block having a selected size and a label identifying vegetation observed within the block.

4. The method of example 3 wherein the block size corresponds to an average tree canopy.

5. The method of any of examples 3-4 wherein the neural network provides a confidence level for each identification of vegetation, and wherein the confidence level below the threshold results in a reduced block size being used for further iterations of identifying forms and amounts of vegetation until the threshold is met.

6. The method of any of examples 1-6 and further including
determining carbon offset values for multiple properties and aggregation the determined carbon offset values.

7. The method of example 6 wherein carbon offset values for multiple properties are aggregated until a threshold total value is reached, forming an aggregated carbon offset.

8. The method of example 7 and further comprising electronically updating an electronic exchange with the aggregated carbon offset.

9. The method of example 8 and further including
receiving an electronic transfer representative of a purchase of the aggregated carbon offset, subtracting an aggregation fee from the electronic value transfer, apportioning the remaining electronic value transfer to respective property owners based on respective property carbon offset values, and electronically transferring the apportioned values to the respective property owners.

10. The method of any of examples 1-9 wherein the image comprises a satellite image.

11. The method of any of examples 1-10 wherein the geospatial coordinates are identified based on public property ownership records.

12. A machine-readable storage device having instructions for execution by a processor of a machine to cause the processor to perform operations to perform any of the methods of examples 1-11.

13. A device including a processor and a memory device coupled to the processor and having a program stored thereon for execution by the processor to perform operations to perform any of the methods of examples 1-11.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining geospatial coordinates for multiple points defining boundaries of a subject property;
obtaining an image of the subject property from one or more positions above the earth;
identifying, by a neural network trained on labeled images wherein each labeled image comprises a block having a selected size and a label identifying vegetation observed within the block, forms and amounts of vegetation within the boundaries of the subject property based on the image;
determining carbon offset values for the forms of vegetation identified within the boundaries of the subject property; and
combining the carbon offset values based on the amounts of vegetation to derive a total offset for the subject property.

2. The method of claim 1 wherein the block size corresponds to an average tree canopy.

3. The method of claim 1 wherein the neural network provides a confidence level for each identification of vegetation, and wherein the confidence level below the threshold results in a reduced block size being used for further iterations of identifying forms and amounts of vegetation until the threshold is met.

4. The method of claim 1 and further comprising:
determining carbon offset values for multiple properties; and
aggregation the determined carbon offset values.

5. The method of claim 4 wherein carbon offset values for multiple properties are aggregated until a threshold total value is reached, forming an aggregated carbon offset.

6. The method of claim 5 and further comprising electronically updating an electronic exchange with the aggregated carbon offset.

7. The method of claim 6 and further comprising:
receiving an electronic transfer representative of a purchase of the aggregated carbon offset;
subtracting an aggregation fee from the electronic value transfer;
apportioning the remaining electronic value transfer to respective property owners based on respective property carbon offset values; and
electronically transferring the apportioned values to the respective property owners.

8. The method of claim 1 wherein the image comprises a satellite image.

9. The method of claim 1 wherein the geospatial coordinates are identified based on public property ownership records.

10. A machine-readable storage device having instructions for execution by a processor of a machine to cause the processor to perform operations to perform a method, the operations comprising:
 obtaining geospatial coordinates for multiple points defining boundaries of a subject property;
 obtaining an image of the subject property from one or more positions above the earth;
 identifying, by a neural network trained on labeled images wherein each labeled image comprises a block having a selected size and a label identifying vegetation observed within the block, forms and amounts of vegetation within the boundaries of the subject property based on the image;
 determining carbon offset values for the forms of vegetation identified within the boundaries of the subject property; and
 combining the carbon offset values based on the amounts of vegetation to derive a total offset for the subject property.

11. The device of claim 10 wherein the neural network provides a confidence level for each identification of vegetation, and wherein the confidence level below the threshold results in a reduced block size being used for further iterations of identifying forms and amounts of vegetation until the threshold is met.

12. The device of claim 10 and further comprising:
 determining carbon offset values for multiple properties; and
 aggregation the determined carbon offset values.

13. The device of claim 12 wherein carbon offset values for multiple properties are aggregated until a threshold total value is reached, forming an aggregated carbon offset and further comprising electronically updating an electronic exchange with the aggregated carbon offset.

14. The device of claim 13 and further comprising:
 receiving an electronic transfer representative of a purchase of the aggregated carbon offset;
 subtracting an aggregation fee from the electronic value transfer;
 apportioning the remaining electronic value transfer to respective property owners based on respective property carbon offset values; and
 electronically transferring the apportioned values to the respective property owners.

15. A device comprising:
 a processor; and
 a memory device coupled to the processor and having a program stored thereon for execution by the processor to perform operations comprising:
 obtaining geospatial coordinates for multiple points defining boundaries of a subject property;
 obtaining an image of the subject property from one or more positions above the earth;
 identifying, by a neural network trained on labeled images wherein each labeled image comprises a block having a selected size and a label identifying vegetation observed within the block, forms and amounts of vegetation within the boundaries of the subject property based on the image;
 determining carbon offset values for the forms of vegetation identified within the boundaries of the subject property; and
 combining the carbon offset values based on the amounts of vegetation to derive a total offset for the subject property.

16. The device of claim 15 and further comprising:
 determining carbon offset values for multiple properties; and
 aggregation the determined carbon offset values until a threshold total value is reached, forming an aggregated carbon offset.

* * * * *